(12) United States Patent
Ruan et al.

(10) Patent No.: US 9,809,975 B2
(45) Date of Patent: Nov. 7, 2017

(54) SEISMIC ISOLATION ASSEMBLY

(71) Applicant: ITT MANUFACTURING ENTERPRISES LLC, Wilmington, DE (US)

(72) Inventors: Shubin Ruan, Williamsville, NY (US); Thomas Zemanek, Laguna Hills, CA (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 0 days.

(21) Appl. No.: 14/995,314

(22) Filed: Jan. 14, 2016

(65) Prior Publication Data

US 2016/0130805 A1    May 12, 2016

Related U.S. Application Data

(63) Continuation of application No. 14/560,817, filed on Dec. 4, 2014, now Pat. No. 9,255,399.
(Continued)

(51) Int. Cl.
*F16F 15/02*    (2006.01)
*F16F 7/14*    (2006.01)
(Continued)

(52) U.S. Cl.
CPC .............. *E04B 1/985* (2013.01); *E02D 27/34* (2013.01); *E02D 27/42* (2013.01); *E04H 9/02* (2013.01); *E04H 12/22* (2013.01); *F16F 7/00* (2013.01); *F16F 7/14* (2013.01); *F16F 15/022* (2013.01); *F16F 15/06* (2013.01); *G10K 11/16* (2013.01);
(Continued)

(58) Field of Classification Search
None
See application file for complete search history.

(56) References Cited

U.S. PATENT DOCUMENTS 3,794,277 A * 2/1974 Smedley ................. F16F 7/127
174/161 R
4,108,270 A    8/1978 Mifsud
(Continued)

FOREIGN PATENT DOCUMENTS

CN    101882460 A    11/2010
CN    201971165 U    9/2011
(Continued)

OTHER PUBLICATIONS

European Patent Application No. PCT/EP2015/071541; Filed Sep. 21, 2015; 24 pages.
(Continued)

*Primary Examiner* — James Ference
*Assistant Examiner* — Kyle Walraed-Sullivan
(74) *Attorney, Agent, or Firm* — Barclay Damon, LLP

(57) ABSTRACT

A seismic isolation assembly is defined by a first support plate and a second support plate disposed in parallel relation with a spacing being provided between the support plates. The first support plate is connected to ground and the second support plate is attached to a structure to be isolated. A set of wire rope isolators are disposed between the first and second support plates as well as at least one linear damper that is angularly disposed and mounted between the first and second support plates.

16 Claims, 6 Drawing Sheets

Related U.S. Application Data

(60) Provisional application No. 61/913,035, filed on Dec. 6, 2013.

(51) Int. Cl.
*E04B 1/98* (2006.01)
*E04H 9/02* (2006.01)
*F16F 7/00* (2006.01)
*E02D 27/42* (2006.01)
*F16F 15/06* (2006.01)
*G10K 11/16* (2006.01)
*E02D 27/34* (2006.01)
*E04H 12/22* (2006.01)

(52) U.S. Cl.
CPC ... *F16F 2222/12* (2013.01); *F16F 2230/0023* (2013.01); *F16F 2236/04* (2013.01); *F16F 2238/04* (2013.01)

(56) References Cited

U.S. PATENT DOCUMENTS

| | | | |
|---|---|---|---|
| 4,336,917 A | 6/1982 | Phillips | |
| 5,020,644 A * | 6/1991 | Novoa | F16F 7/10 188/268 |
| 5,042,024 A * | 8/1991 | Kurosawa | G11B 33/08 720/600 |
| 5,169,110 A * | 12/1992 | Snaith | F16F 7/14 248/570 |
| 5,441,243 A | 8/1995 | Loziuk | |
| 5,442,883 A | 8/1995 | Nishimura et al. | |
| 5,509,238 A * | 4/1996 | Scalfati | E04H 9/021 52/167.4 |
| 5,522,585 A | 6/1996 | Loziuk | |
| 5,549,285 A | 8/1996 | Collins | |
| 5,559,671 A | 9/1996 | Dan et al. | |
| 5,791,636 A | 8/1998 | Loziuk | |
| 5,797,227 A | 8/1998 | Garza-Tamez | |
| 5,907,880 A | 6/1999 | Durazzani et al. | |
| 6,098,966 A | 8/2000 | Latvis, Jr. et al. | |
| 6,244,579 B1 | 6/2001 | Latvis, Jr. | |
| 6,286,805 B1 | 9/2001 | Bunn et al. | |
| 6,290,217 B1 | 9/2001 | Schneider et al. | |
| 6,406,011 B1 | 6/2002 | Kosar et al. | |
| 6,530,563 B1 | 3/2003 | Miller et al. | |
| 6,585,241 B1 | 7/2003 | Hartl et al. | |
| 6,843,613 B2 | 1/2005 | Gelfand et al. | |
| 7,108,111 B2 | 9/2006 | Spyche, Jr. et al. | |
| 7,325,792 B2 | 2/2008 | Siino et al. | |
| 7,337,586 B2 | 3/2008 | Lin et al. | |
| 7,510,147 B2 * | 3/2009 | Haber | B64D 1/02 244/137.1 |
| 7,852,274 B2 | 12/2010 | Madden, Jr. et al. | |
| 7,990,639 B2 | 8/2011 | Ouellette et al. | |
| 8,235,351 B1 | 8/2012 | Van Lear | |
| 8,444,121 B2 | 5/2013 | Hadden et al. | |
| 2003/0016996 A1 | 1/2003 | Gelfand et al. | |
| 2003/0132077 A1 * | 7/2003 | Davis | F16F 7/10 188/380 |
| 2004/0159995 A1 * | 8/2004 | Pavuk | B60G 5/00 267/248 |
| 2005/0109912 A1 * | 5/2005 | Mulder | F16F 15/02 248/564 |
| 2006/0201759 A1 | 9/2006 | Spyche, Jr. et al. | |
| 2006/0254869 A1 * | 11/2006 | Wang | F16F 15/067 188/378 |
| 2007/0258861 A1 | 11/2007 | Barket, Jr. et al. | |
| 2008/0151685 A1 * | 6/2008 | Wang | F16F 15/067 366/217 |
| 2010/0117275 A1 * | 5/2010 | Nakamura | B60N 2/502 267/133 |
| 2010/0149059 A1 | 6/2010 | Patel | |
| 2011/0133078 A1 | 6/2011 | Barket, Jr. et al. | |
| 2011/0180685 A1 | 7/2011 | Borgen | |
| 2012/0091311 A1 | 4/2012 | Rizk et al. | |
| 2012/0175489 A1 * | 7/2012 | Taylor | F16F 15/067 248/563 |
| 2012/0204509 A1 * | 8/2012 | Lim | E04H 9/021 52/393 |
| 2012/0248282 A1 | 10/2012 | Malchev et al. | |
| 2013/0068918 A1 | 3/2013 | Mulder | |
| 2014/0008851 A1 * | 1/2014 | Chapman | F16M 11/043 267/140.11 |
| 2014/0060296 A1 | 3/2014 | Monteil et al. | |
| 2014/0305334 A1 * | 10/2014 | Blase | B61C 17/00 105/26.05 |

FOREIGN PATENT DOCUMENTS

| | | |
|---|---|---|
| CN | 103410605 A | 11/2013 |
| DE | 10 2006 054 274 B3 | 12/2007 |
| EP | 0 103 188 B1 | 12/1986 |
| EP | 0 655 111 B1 | 6/1996 |
| EP | 0 813 203 A1 | 12/1997 |
| EP | 1 122 458 A1 | 8/2001 |
| EP | 1 138 974 A2 | 10/2001 |
| EP | 1 140 602 B1 | 7/2003 |
| EP | 1 132 646 B1 | 2/2005 |
| EP | 1 666 760 B1 | 5/2008 |
| EP | 2 107 268 B1 | 11/2010 |
| EP | 1 481 132 B1 | 10/2012 |
| EP | 2 392 836 B1 | 3/2013 |
| JP | 2007-39894 | 2/2007 |
| JP | 2012-246998 | 12/2012 |
| WO | WO 93/12367 | 6/1993 |
| WO | WO 2008/022466 A1 | 2/2008 |
| WO | WO 2009/113868 A1 | 9/2009 |
| WO | WO 2010/075109 A1 | 7/2010 |
| WO | WO 2011/151254 A1 | 12/2011 |
| WO | WO 2012/051423 A2 | 4/2012 |
| WO | WO 2012/152826 A1 | 11/2012 |

OTHER PUBLICATIONS

European Search Report for EP 14 19 4009.8; dated Jun. 3, 2015; 10 pages.
Seismic Testing of a Building Structure With a Semi-Active Fluid Damper Control System; M.D. Symans et al.; Earthquake Engineering and Structural Dynamics; vol. 26; 759-777; 1997; 20 pages.
Study of Wire Rope Systems for Seismic Protection of Equipment in Buildings; G.F. Demetriades et al.; Eng. Struct. 1993, vol. 15, No. 5; pp. 321-334; 14 pages.
Passive Fluid Viscous Damping Systems for Seismic Energy Dissipation; ISET Journal of Earthquake Technology; Paper No. 382; vol. 35; No. 4; Dec. 1998; pp. 185-206; 22 pages.
The Application of Energy Dissipating Damping Devices to an Engineered Structure or Mechanism; Douglas P. Taylor, President; Taylor Devices, Inc.; www.shockandvibration.com; 2010; 60 pages.
Chilean Office Action for CL 201403245; dated Dec. 14, 2016; 7 pages.
New Zealand Examination Report for NZ 702029; dated Mar. 29, 2017; 6 pages.
Chilean Office Action for CL 3245-2014; Dated: Jun. 2017; 7 pages.

* cited by examiner

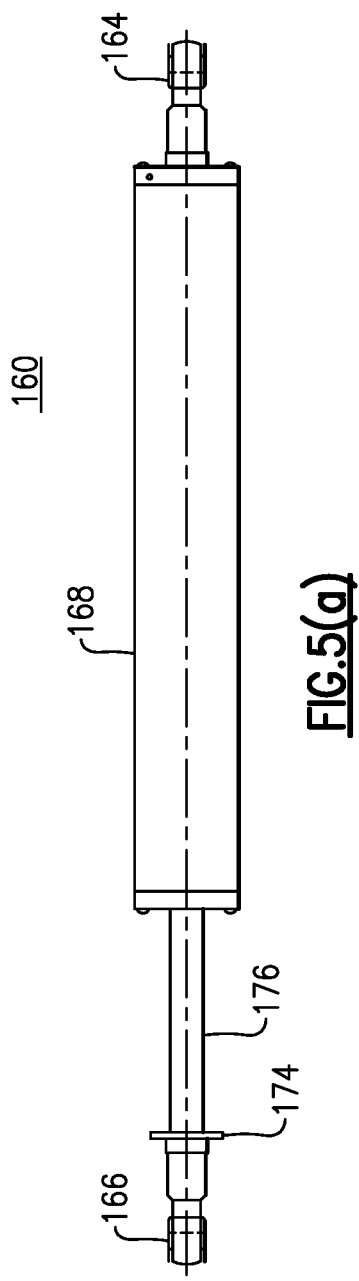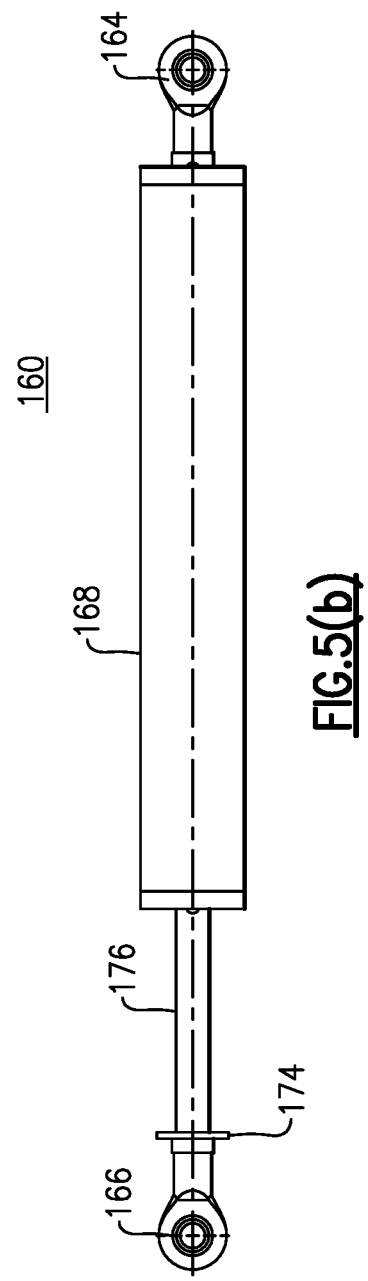
FIG.5(a)
FIG.5(b)

SEISMIC ISOLATION ASSEMBLY

CROSS REFERENCE TO RELATED APPLICATION

This application is a continuation application of U.S. Ser. No. 14/560,817, filed Dec. 4, 2014, entitled: Seismic Isolation Assembly under relevant paragraphs of 35 U.S.C. §120, which claims priority under relevant portions of 35 U.S.C. §119 to U.S. Ser. No. 61/913,035, filed Dec. 6, 2013, entitled: Seismic Isolation Assembly, the entire contents of each of the above-listed applications being incorporated by reference herein in their entirety.

TECHNICAL FIELD

This application is directed generally to the field of isolation assemblies and more specifically to a seismic isolation assembly for use with ground supported structures, including tall and eccentrically defined structures.

BACKGROUND OF THE PRIOR ART

Ground supported structures or apparatus are susceptible to various forms of loading, including seismic and environmental load inputs, among others, over their useful life. One example of a supported structure is a circuit breaker for use in an electrical power grid assembly, shown in FIG. 1. This structure 10 is defined by a vertical mast 14 that supports an upper horizontally disposed cross member 18, the latter being configured for connection to a plurality of high tension lines 17. The length of the vertical mast 14 is considerably longer than that of the horizontal member 18, the latter being supported at the top of the vertical member 14 and therefore producing a high center of gravity (CG) that can also be eccentrically disposed in relation to the lower or bottom end of the structure 10 at which the structure is supported. The herein described structure 10 further includes a plurality of ceramic insulator disc-like plates 22 that are disposed in a sequential or stacked configuration axially along at least portions of each of the vertical mast 14 and horizontal cross member 18. When subjected to seismic loads, these ceramic insulator plates 22 may become more susceptible to cracking and fracture, which adversely affects performance. The time taken to inspect these structures for damage following a seismic event and the additional cost and time impact required for repair and replacement can be significant.

Therefore, it is generally accepted that such structures be decoupled from seismic loads, in an effort to isolate the structures and render them earthquake proof. Certain assemblies are known that provide isolation using wire rope isolators from compressive, tensile and shear loads. While such assemblies are highly effective for a number of supported structures, the high-CG and/or eccentric nature of structures such as depicted in FIG. 1 create multi-directional load inputs that cannot easily be compensated using only wire rope isolators.

As a result, it is a general desire to provide a reliably consistent seismic isolation assembly that improves the useful life and reliability of eccentrically constructed structures.

BRIEF DESCRIPTION

Therefore and according to one aspect, there is provided an assembly for seismically isolating a structure, the assembly comprising a first support plate configured for fixed attachment to a base, a second support plate disposed in parallel and spaced relation with the first support plate, the second support plate being configured for fixed attachment to the structure and a plurality of wire rope isolators disposed in the spacing between the first and second support plates. A plurality of linear dampers are angularly disposed between each of the first and second support plates.

In one embodiment, the first and second support plates are horizontally disposed with the first support plate being disposed beneath the second support plate. The wire rope isolators are attached to the underside of the second support plate and to a support block that is fixedly attached to the base. The linear dampers include a linearly or axially movable end attached to the second support plate and an opposite end attached to a support that is fixedly mounted to the base. The linear dampers can according to one embodiment be comprised of viscous based dampers, such as hydraulic dampers, that provide the additional damping for multi-directional load inputs from a supported structure.

According to at least one version, sets of linear dampers can be disposed between evenly distributed wire rope isolators. Each set of linear dampers can include at least one or a plurality of dampers commonly disposed at an angle of between approximately 90 and 45 degrees relative to the second support plate. In one exemplary version, multiple sets, each including at least two viscous dampers are inwardly disposed at an angle between the upper and lower support plates. In one version, this angle is approximately 20 degrees from vertical.

In another exemplary version, four (4) wire rope isolators are disposed in spaced relation between the upper and lower support plates. A corresponding number of sets of linear dampers are additionally disposed, with a set being mounted between each of adjacently spaced wire rope isolators and about the outer periphery of the support plates. Each set of linear dampers can include two or more linear dampers commonly and inwardly disposed from a base mounted support toward the end of the second support plate at the disposed angle.

According to another embodiment, there is provided a method for isolating a structure from seismic loads, said method comprising:
  providing a first support plate that is configured to be fixedly attached to a base;
  providing a second support plate parallel to the first plate and in spaced relation therewith, the second support plate being configured to be fixedly attached to a structure;
  mounting a plurality of wire rope isolators between the first and second support plates, each of the wire rope isolators being spaced from one another; and
  attaching a plurality of linear dampers at respective ends between the first and second support plates, the linear dampers being angularly mounted relative to the support plates.

In one version, the linear dampers are viscous and in which the first and second support plates are provided along a horizontal plane with the wire rope isolators being configured horizontally between the support plates and in which at least one linear damper is vertically disposed relative to the assembly between each of the wire rope isolators.

Sets of linear dampers, such as hydraulic or other viscous dampers, can be commonly and vertically disposed at a predetermined angle between the wire rope isolators. In one version, sets of two or more linear dampers can be mounted to the second support plate and the base in side by side relation to provide additional damping.

One advantage provided by the herein described seismic isolation assembly is that additional damping can be provided to a supported ground structure having a high CG and/or eccentric configuration and capable of producing a multi-dimensional load input, which can produce rocking of the structure.

Another advantage is that the herein described seismic isolation assembly is reliable and less prone to hysteresis effects.

Yet another advantage is that the number of linear dampers can easily be adjusted as needed to change the damping characteristics of the herein described system and permitting versatility as to numerous ground structures and loading conditions.

These and other features and advantages will be readily from the following Detailed Description which should be read in conjunction with the accompanying drawings.

BRIEF DESCRIPTION OF THE DRAWINGS

FIGS. 5(a) and 5(b) are side views of an exemplary linear damper for use in the seismic isolation assembly of FIGS. 2-4.

DETAILED DESCRIPTION

Figure 1:
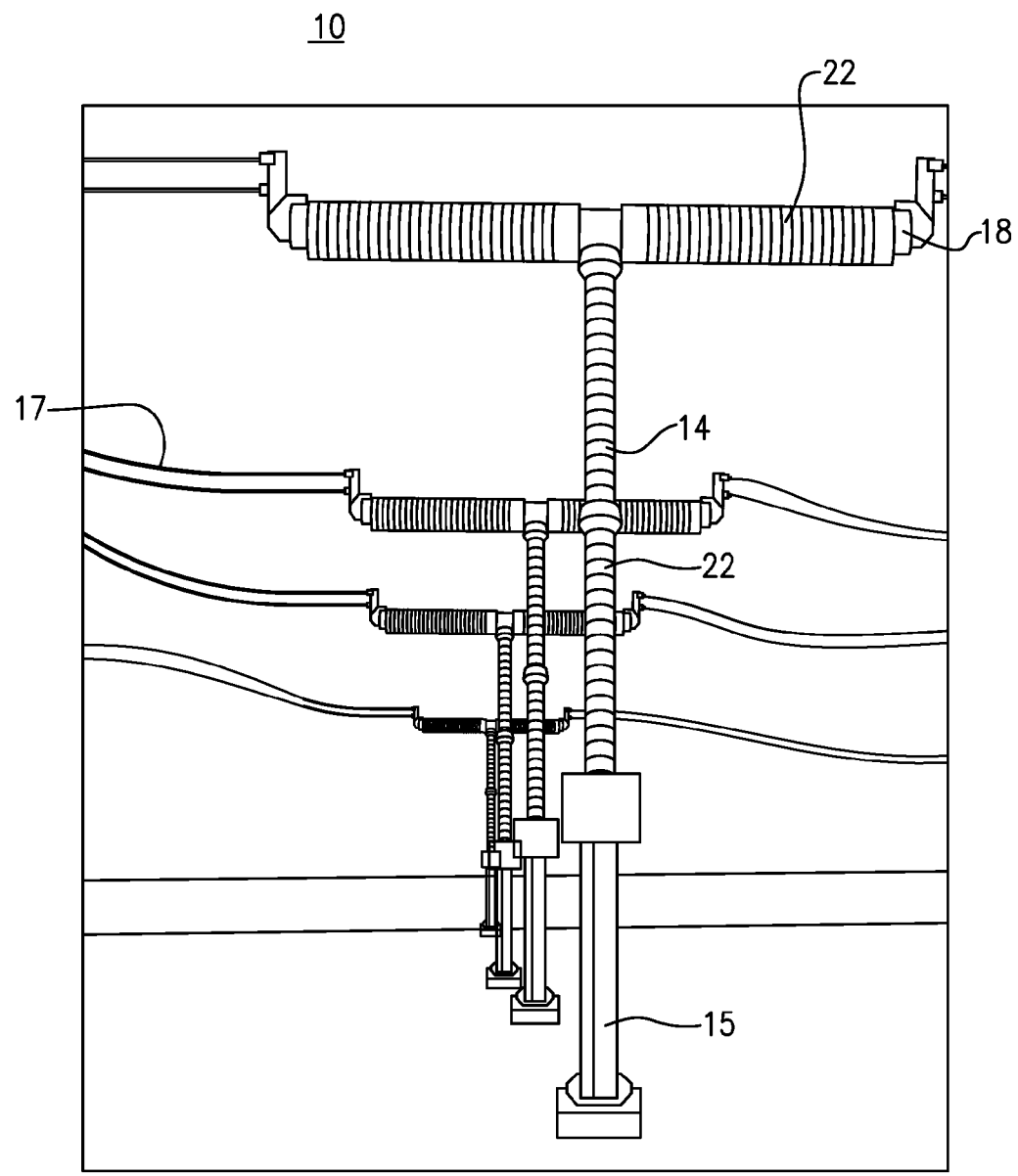
FIG. 1 is a perspective view of an exemplary ground supported structure.

The following relates to an exemplary embodiment of an assembly that is utilized to isolate seismic load inputs and in particular those inputs relative to an eccentric ground supported structure, such as the circuit breaker 10 depicted in FIG. 1. It will be readily apparent to those of sufficient skill from the following description, however, that this assembly and variants thereof can easily be employed for effectively isolating other ground supported structures. In addition and in the course of discussion, certain terms such as horizontal", "vertical", "upper", "lower", "top", "bottom", "above", "below" and the like are used in order to provide a suitable frame of reference with regard to the accompanying drawings. These terms, however, are not intended to limit the scope of the inventive concepts, including the appended claims, unless such limitations are specifically indicated.

In addition, the drawings being intended to depict salient features are not necessarily to scale. As a result, the drawings should not be relied upon for scaling purposes.

Figure 2:
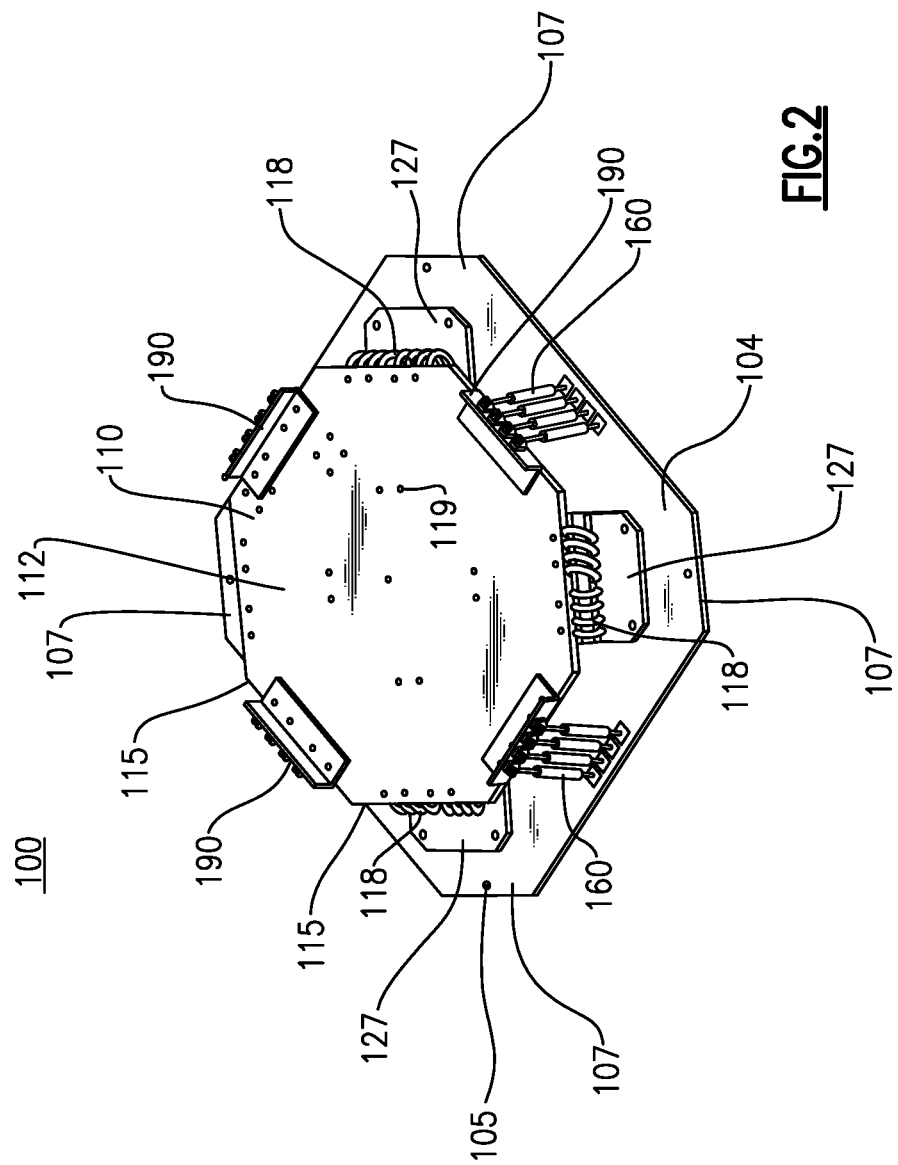
FIG. 2 is top perspective view of a seismic isolation assembly in accordance with an exemplary embodiment.
Figure 3:
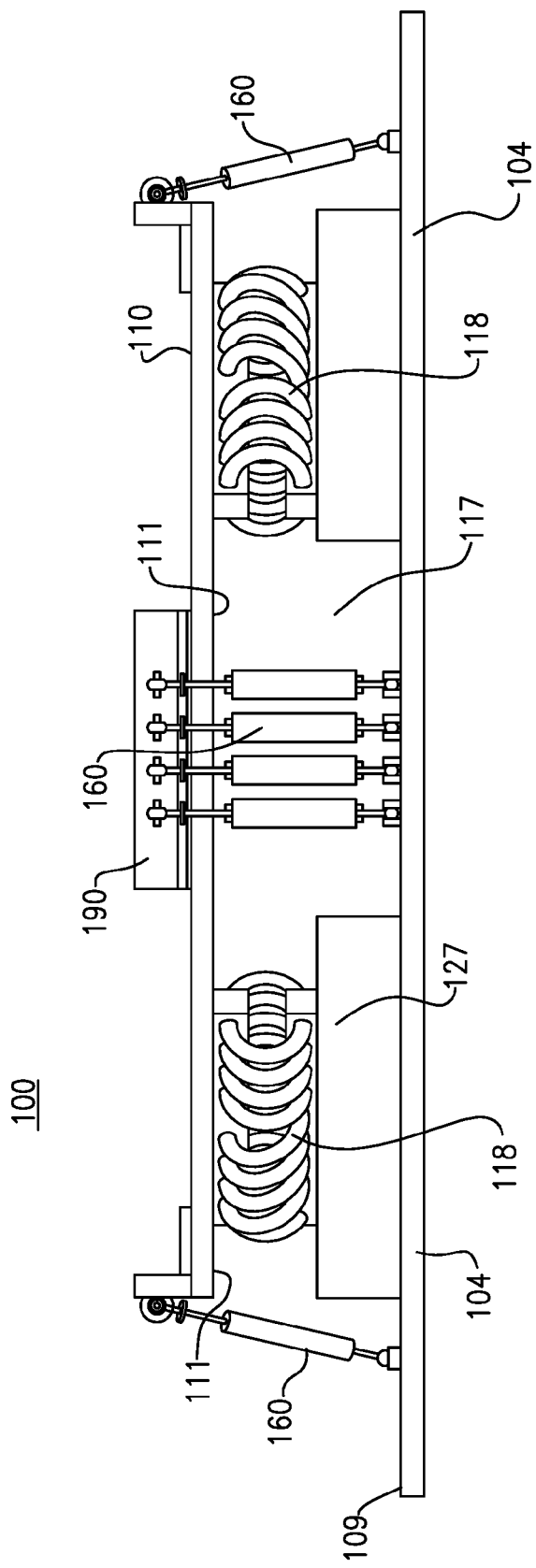
FIG. 3 is a side elevational view of the seismic isolation assembly of FIG. 2.

Referring to FIGS. 2 and 3, an exemplary seismic isolation assembly 100 includes a first or lower support plate 104 and a second or upper support plate 110. Each of the lower and upper support plates 104, 110 are made from a suitable structural material, such as stainless steel, and disposed in substantially parallel relation with one another. The perspective view of FIG. 2 shows that the lower support plate 104 is attached, such through the use of bolts (not shown) secured through openings 105 extending through the thickness of the lower support plate 104 to a support structure on the ground. As more clearly seen in FIG. 3, a spacing 117 is defined between an upper surface or side 109 of the lower support plate 104 and a lower surface or side 111 of the upper support plate 110, as discussed herein. According to this embodiment, the lower support plate 104 is substantially rectangular in terms of configuration, with each corner 107 of the lower support plate 104 being beveled. The upper support plate 110 is smaller in terms of its overall length and width dimensions than that of the lower support plate 104. For purposes of this exemplary embodiment, the upper support plate 110 is further defined by a substantially octagonal shape defined by respective sides 115. It should be noted, however, that the herein described configuration is exemplary and other suitable polygonal shapes, including circular configurations, could be alternatively provided for either or both of the lower and upper support plates 104, 110, provided each are substantially planar. When assembled, the upper support plate 110 is substantially centered above the lower support plate 104, the support plates being disposed in a substantially horizontal configuration. A top or upper side 112 of the upper support plate 110 includes at least one set of openings 119 that are spaced and configured for fixedly and securely retaining an end of the structure to be isolated.

Still referring to FIGS. 2 and 3, a plurality of wire rope isolators 118 are disposed within the defined spacing 117 between the lower and upper support plates 104, 110. According to this embodiment, each wire rope isolator 118 is individually secured to the lower surface 111 of the upper support plate 110 and to the upper surface of a support block or platform 127, the latter being bolted or otherwise fixedly mounted to the upper surface 109 of the lower support plate 104. The support block 127 is exemplary and other mounting techniques to the lower support surface 104 or the base 113 can be utilized. According to this exemplary embodiment, a total of four (4) wire rope isolators 118 are disposed in equally spaced relation to one another between the lower and upper support plates 104, 110, although this parameter can also be easily varied depending on loading conditions and the structure to be isolated.

Figure 4A:
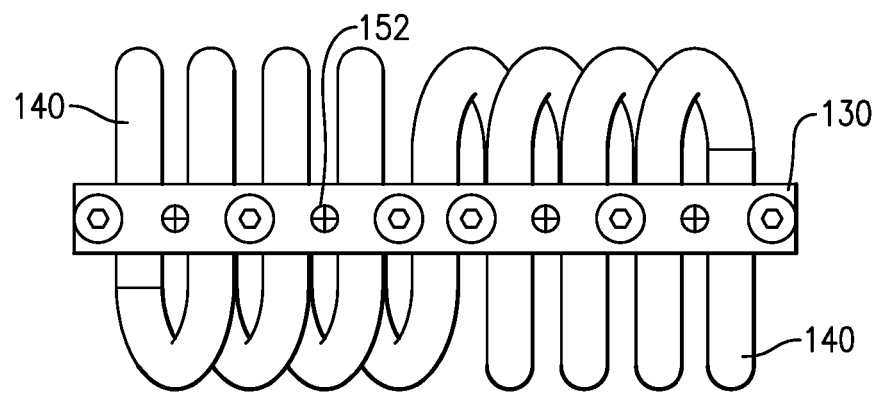
FIGS. 4(a) and 4(b) are top plan and side views of an exemplary wire rope isolator for use in the seismic isolation assembly of FIGS. 2 and 3.
Figure 4B:
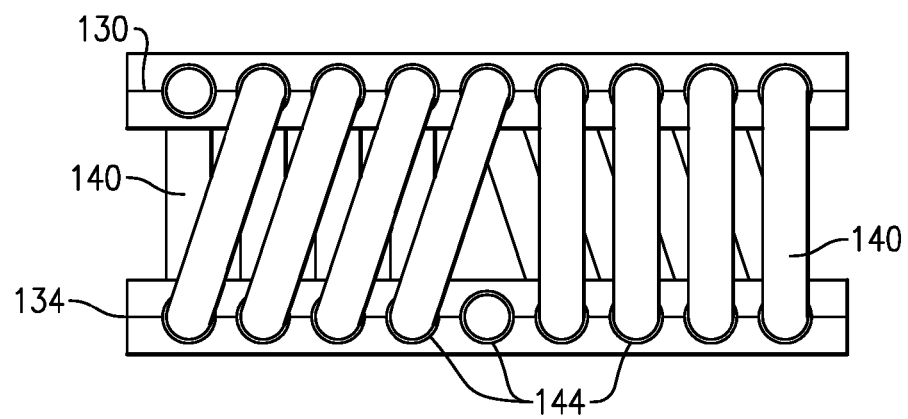

More specifically and referring to FIGS. 4(a) and 4(b), each wire rope isolator 118 according to this exemplary embodiment includes a rectangular shaped upper mounting block 130 and a parallel and correspondingly shaped lower mounting block 134, respectively. A plurality of cylindrical wire coils 140 are introduced between the mounting blocks 130, 134 through a spaced series of lateral holes 144 provided in each mounting block 130, 134, as the coils 140 are threaded therethrough and in which the ends of each coil 140 are attached to the upper mounting block 130. According to this embodiment, the mounting blocks 130, 134 are each formed from aluminum and the cylindrical wire coils 140 are formed from stainless steel, but these materials can be suitably varied. In addition, the size of the mounting blocks 130, 134 and the lateral holes 144 of the isolators 118, as well as the thickness of the cylindrical wire in the coils 140 used can also be suitably varied, depending on the structure being supported and required spring rate, deflection and damping characteristics of a particular application. For example, one suitable wire rope isolator design which can be used for this purpose is described in commonly owned U.S. Pat. No. 5,449,285 to Collins, the entire contents of which are herein incorporated by reference. It will be readily apparent from the following discussion that other suitable isolator assemblies can be alternatively used.

Each of the mounting blocks 130, 134 of the wire rope isolators 118 further includes a set of equally spaced transverse through openings 152 that are provided in opposing top and bottom sides thereof to permit attachment to the bottom surface 111 of the upper support plate 110 and the top surface of the supporting block 127, respectively, using appropriately sized threaded fasteners.

As shown in FIGS. 2 and 3, the herein described isolation assembly further includes an additional plurality of linear dampers 160 that are disposed between the lower support plate 104 and the upper support plate 110. These dampers 160 provide additional damping that cannot be provided by the wire rope isolators 118 due to loading conditions of the supported structure 10, FIG. 1.

Referring to FIGS. 5(a) and 5(b), each of the linear dampers 160 according to this exemplary embodiment are defined by a cylindrical housing 168 having a fixed end 164 and an oppositely disposed axially movable end 166. The axially movable end 166 is further attached to a piston assembly 174 that includes a piston rod 176 extending within the interior of the cylindrical housing 168. The interior of the cylindrical housing 168 defines a damping chamber that is configured to retain a quantity of a hydraulic fluid and in which the piston assembly 174 is configured to displace fluid within the cylinder and induce damping. Each of the movable and fixed ends 164, 166 of the cylinder 168 include fittings that enable transverse mounting. The stroke of the piston assembly 174 can be selected based on the loading characteristics and structure to be supported and isolated. One example of a suitable hydraulic damper for these purposes is the LD damper series, manufactured by ITT Enidine, Inc., although other versions can be substituted. Alternatively, other forms of linear dampers such as linear friction dampers can also be substituted herein for the linear hydraulic dampers described herein.

According to this exemplary embodiment, four (4) sets of linear dampers 160 are vertically disposed between the adjacently spaced wire rope isolators 118. Each of the four sets of linear dampers 160 include a plurality of hydraulic viscous dampers in which each fixed end 164 is independently secured to the lower support plate 104 and the movable end 166 is secured to an upwardly extending portion of a mounting block 190, the latter being fixedly attached to the top surface 112 of the upper support plate 110 and secured thereto using bolts or other suitable fasteners (not shown). Each of the linear dampers 160 according to this particular embodiment are vertically disposed at an angle of approximately 68 degrees relative to the upper support plate 110. According to this exemplary embodiment, each set of linear dampers 160 is defined by four (4) hydraulic dampers, which are disposed in side by side parallel relation to one another and independently mounted to the lower support plate 104 and mounting block 190. The number of sets of linear dampers 160 and the number of dampers in each set can be varied, as well as the vertical angle at which the linear dampers 160 are disposed. As a result and due to their ease in accessibility and independent mounting, the number of dampers 160 can be changed "on the fly" for purposes of testing and support/damping in actual use and in which the support block 127 and mounting plate can include a plurality of spaced attachment positions.

As previously noted, the stroke length of each linear damper 160 can be suitably selected based on the loading characteristics, as well as the type of hydraulic fluid retained in the housing 168 and the damping coefficient.

Figure 6:
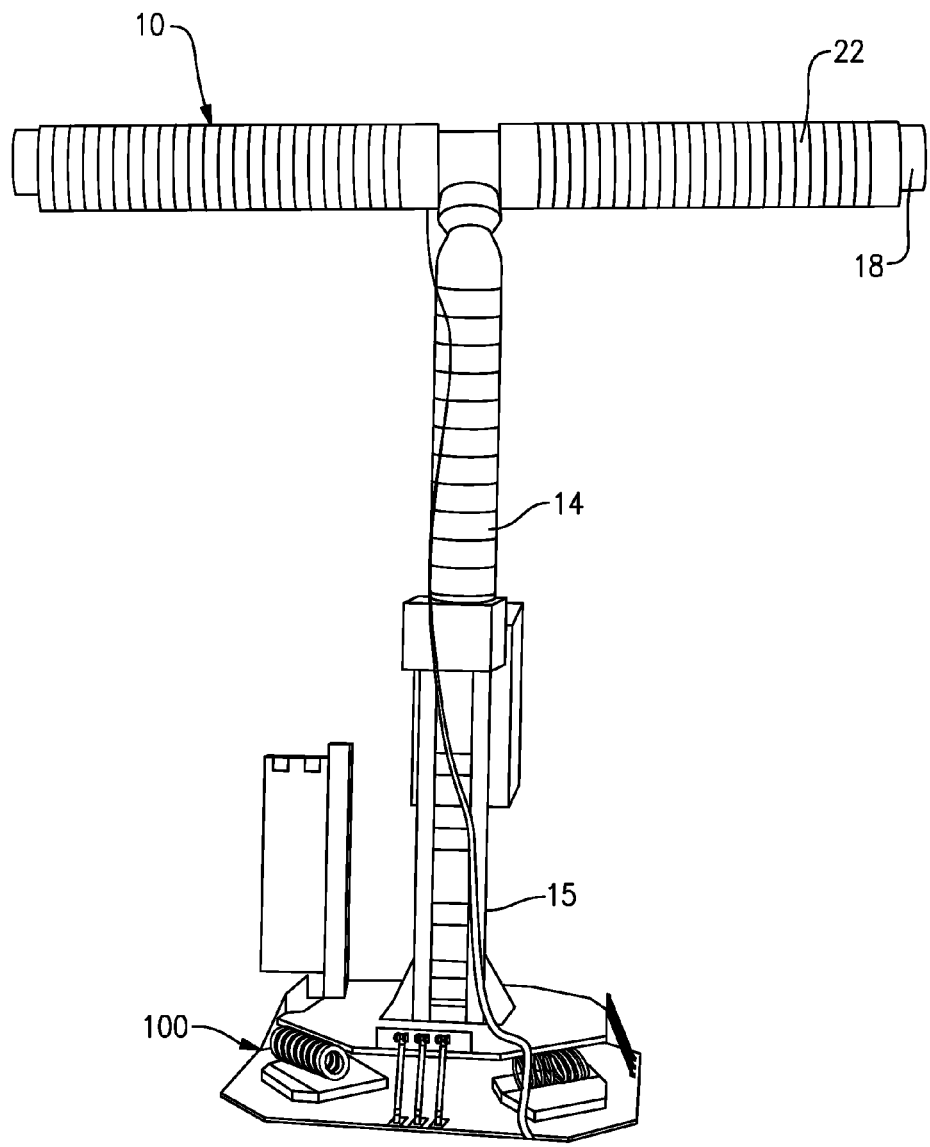
FIG. 6 is a partial view of the ground supported structure of FIG. 1, as supported by the seismic isolation assembly of FIGS. 2-5.

As shown in the figures, particularly FIG. 6 and in terms of overall operation, the circuit breaker of FIG. 1 is again shown having a supporting vertical bracket 15 disposed at the lower or bottom end of the structure 10 that is fixedly mounted to the upper side 112 of the upper support plate 110 while the lower support plate 104 is attached to ground. This supported structure 10 is isolated from seismic inputs from the ground, which is a multi-directional input. Based on the high and/or eccentric center of gravity of the supported structure a rocking component is created, which is non-axial. For purposes of tensile and compressive damping of the supported structure, the wire rope isolators 118 providing a low spring rate and some hysteretic damping in all directions. The linear dampers 160, being angularly mounted relative to the primary axis of the supported structure 10 are configured to provide additional damping to the system in all directions. That is, angular mounting of a plurality of linear dampers 160 at the spaced locations enables additional damping as caused by seismic loads in all directions. The hydraulic damping is required because the wire rope isolators 118 fail to provide sufficient damping in all directions.

PARTS LIST FOR FIGS. 1-6

10 structure, circuit breaker
14 vertical mast
15 supporting vertical bracket
18 horizontal or cross member
22 disc-like insulator plates
100 seismic isolation assembly
104 lower support plate
105 openings
107 corners, lower support plate
109 upper or top side, lower support plate
110 upper support plate
111 lower or bottom side, upper support plate
112 upper or top side, upper support plate
115 sides, upper support plate
117 spacing
118 wire rope isolators
119 openings
127 support block
130 mounting block (upper)
134 mounting block (lower)
140 cylindrical wire coils
144 openings, lateral
152 openings, transverse
160 linear dampers
164 fixed end, viscous damper
166 movable end, viscous damper
168 housing
174 piston assembly
176 piston rod
190 mounting block It will be readily apparent that other variations and modifications are possible utilizing the inventive concepts that have been described herein and further in accordance with the following appended claims.

The invention claimed is:

1. A seismic isolation assembly comprising:
a first support plate having a top surface and a bottom surface, the first support plate configured for fixed attachment to a base;
a second support plate having a top surface and a bottom surface, the second support plate being disposed in parallel relation above the first support plate and configured for fixed attachment to a structure and in which a spacing is defined adjacent to the top surface of the first support plate and the bottom surface of the second support plate;
a plurality of wire rope isolators fixedly mounted in spaced relation between the first support plate and the second support plate, each wire rope isolator comprising a pair of mounting blocks, each of the pair of mounting blocks having a plurality of holes and a plurality of cylindrical wire coils threaded through the plurality of holes, the cylindrical wire coils extending along an axis that is parallel to the first and second support plates; and a plurality of linear dampers, each of the linear dampers being angularly mounted between the first support plate and the second support plate, wherein one end of each of the plurality of linear dampers is mounted to the top surface of the first support plate and an opposite end is mounted to the top surface of the second support plate.

2. A seismic isolation assembly as recited in claim 1, wherein the plurality of linear dampers are mounted in spaced relation between adjacent wire rope isolators.

3. A seismic isolation assembly as recited in claim 2, wherein sets of wire rope isolators are disposed in spaced relation between the first and second support plates and in which at least two linear dampers are disposed in parallel relation between adjacent wire rope isolators.

4. A seismic isolation assembly as recited in claim 1, wherein the plurality of linear dampers are mounted at an angle between about 45 and about 90 degrees relative to the second support plate.

5. A seismic isolation assembly as recited in claim 1, wherein the plurality of linear dampers are hydraulic viscous dampers.

6. A seismic isolation assembly as recited in claim 1, wherein the first and second support plates are disposed in a horizontal orientation.

7. A seismic isolation assembly as recited in claim 3, wherein the plurality of linear dampers are independently mounted.

8. A seismic isolation assembly as recited in claim 3, in which the plurality of linear dampers includes at least three (3) side by side linear dampers disposed at the angle relative to the first support plate and the second support plate.

9. A method for isolating a ground supported structure from seismic loads, said method comprising:

providing a first support plate having a top surface and a bottom surface, the first support plate being attached to ground;

providing a second support plate having a top surface and a bottom surface, the second support plate being in parallel relation to the first support plate, the second support plate being attached to the ground supported structure and in which a spacing is defined adjacent to the top surface of the first support plate and the bottom surface of the second support plate, each of the first support plate and the second support plate being disposed in a horizontal configuration;

mounting a plurality of wire rope isolators in the spacing between the first and second support plates, each of the wire rope isolators comprising a pair of mounting blocks, each of the pair of mounting blocks having a plurality of holes and a plurality of cylindrical wire coils threaded through the plurality of holes, the cylindrical wire coils extending along a defined horizontal axis that is parallel to the first and second support plates; and mounting a plurality of dampers to each of the first and second support plates, wherein one end of each of the plurality of dampers is mounted to the top surface of the first support plate and an opposite end is mounted to the top surface of the second support plate, the plurality of dampers being mounted at an angle relative to the first support plate and the second support plate.

10. A method as recited in claim 9, wherein the mounting angle of the plurality of dampers is between about 45 and 90 degrees relative to the horizontally disposed first support plate and the second support plate.

11. A method as recited in claim 9, in which the plurality of dampers comprise linear dampers having a fixed end attached to the first support plate and an axially movable end attached to the second support plate.

12. A method as recited in claim 11, wherein the plurality of linear dampers are hydraulic viscous dampers.

13. A method as recited in claim 9, in which at least one damper is disposed between adjacently mounted wire rope isolators.

14. A method as recited in claim 11, in which at least one damper of the plurality of dampers is disposed between adjacent wire rope isolators.

15. A method as recited in claim 14, in which four wire rope isolators are disposed in spaced relation between the first and second support plates and in which the at least one damper is angularly disposed and in side by side in parallel relation between adjacent wire rope isolators.

16. A method as recited in claim 14, in which each damper of the plurality of dampers is independently mounted.

* * * * *